United States Patent
Osborn et al.

(10) Patent No.: US 6,568,696 B2
(45) Date of Patent: May 27, 2003

(54) KINGPIN ANGLE MOUNTED SENSOR

(75) Inventors: Jason A. Osborn, Oakes, ND (US);
Neil A. Fuchs, Rutland, ND (US);
Kenneth R. Weber, Milnor, ND (US);
A. John Santos, Farmington, CT (US);
Arnold M. Terrill, Thomaston, CT (US)

(73) Assignee: Clark Equipment Company, Woodcliff Lake, NJ (US)

( * ) Notice: Subject to any disclaimer, the term of this patent is extended or adjusted under 35 U.S.C. 154(b) by 155 days.

(21) Appl. No.: 09/733,107

(22) Filed: Dec. 8, 2000

(65) Prior Publication Data

US 2002/0070520 A1 Jun. 13, 2002

(51) Int. Cl.<sup>7</sup> ............................ B62D 15/02; B62D 7/18
(52) U.S. Cl. .................................. 280/93.5; 280/93.512
(58) Field of Search .......................... 280/93.5, 93.512; 73/1.75, 1.79, 488, 494; 324/714, 713, 691, 723

(56) References Cited

U.S. PATENT DOCUMENTS

| | | | | |
|---|---|---|---|---|
| 4,775,026 A | * | 10/1988 | Sollbach et al. | ............ 180/249 |
| 4,798,394 A | * | 1/1989 | Pollock et al. | ......... 280/93.512 |
| 5,366,042 A | * | 11/1994 | Wilks et al. | ................ 280/93.5 |
| 6,137,288 A | | 10/2000 | Luetzow | ..................... 324/207 |
| 6,293,022 B1 | * | 9/2001 | Chino et al. | ............. 33/203.18 |
| 6,502,839 B1 | * | 1/2003 | Chino et al. | ........... 280/93.512 |

FOREIGN PATENT DOCUMENTS

| EP | 0 330 632 | 8/1989 |
|---|---|---|
| EP | 0 888 951 A | 1/1999 |
| EP | 0 905 006 | 3/1999 |

* cited by examiner

Primary Examiner—Paul N. Dickson
Assistant Examiner—Joselynn Y Sliteris
(74) Attorney, Agent, or Firm—Westman, Champlin & Kelly, P.A.

(57) ABSTRACT

An angle sensor is used for determining the relative position of a steerable wheel hub, relative to a fixed wheel mounting hub. The angle sensor has a portion mounted on the fixed hub, but received in a recess in the kingpin. The kingpin has a central bore that receives a movable shaft of the sensor which is driven by the kingpin. As the steerable wheel hub is steered, it rotates about the axis of the kingpin and rotates the kingpin. The kingpin drives the shaft of the sensor to provide for an indication of the amount of pivotal movement between the wheel hub and the wheel mounting hub.

6 Claims, 2 Drawing Sheets

KINGPIN ANGLE MOUNTED SENSOR

BACKGROUND OF THE INVENTION

The present invention relates to an angle sensor for sensing the angular position of a steerable wheel on a vehicle, wherein the sensor is mounted to be concentric with and internally connected to the kingpin that pivotally mounts a wheel hub to a fixed hub on the axle.

A steerable wheel industrial loader and its controls are described in copending U.S. Application entitled Selectable Control Parameters on Power Machine, Ser. No. 09/733,221, filed Dec. 8, 2000, the disclosure of which is incorporated by reference.

In modern steerable industrial vehicles, the wheels may be independently supported and independently steerable, and it is necessary to have coordinated steering angles between front and rear wheels, as well as between the wheels on the same axle but on opposite sides of the wheels. Computer controls are able to resolve signals indicating steer angle differences, and make adjustments to the steering system for appropriate matching angles, or if desired, providing different angles of certain wheels for various purposes.

In order to accurately control the steering angle of a steerable wheel, the angle must be sensed correctly. The sensor also has to be located so that it is not damaged by external conditions, such as rocks or shaking, bumping or the like.

Angle sensors have been known for years, and the Torrington Company makes various angle sensors that are highly reliable and compact. Many of these are solid state sensors that will sense angles between a stationary housing and a rotatable stem or drive shaft very accurately, and reliably, with low power consumption.

SUMMARY OF THE INVENTION

The present invention relates to an angle sensor for sensing the angular position of a steerable wheel and hub relative to a reference position, normally the longitudinal axis of a vehicle. The angle sensor is mounted in a bore in and made a part of the kingpin that supports the rotating wheel hub to its fixed wheel support housing on the axle of the vehicle. The sensor has fully protected rotatable parts that are rotated relative to each other about the axis of the kingpin when the wheel is steered.

The kingpin structure is a headed pin that is passed through bores in aligning parts that overlap so that the wheel hub, which has an annular support ring with top and bottom pads with bores for the kingpins, is held onto mating ears on the fixed wheel support housing on the axle. There are king pins on both the top and bottom of the wheel hub. One king pin has an axial bore with an insert shaft having a drive tang or coupling that engages a rotatable shaft of an angle sensor that is mounted in a recess in the other end of the kingpin. The sensor housing is mounted on an arm supported on the stationary wheel support housing. The kingpin will rotate with the wheel hub as the wheel is steered, and will drive the rotatable shaft of the angle sensor. The angle sensor housing remains fixed so that relative rotation can be sensed.

DETAILED DESCRIPTION OF THE PREFERRED EMBODIMENTS

Figure 1:
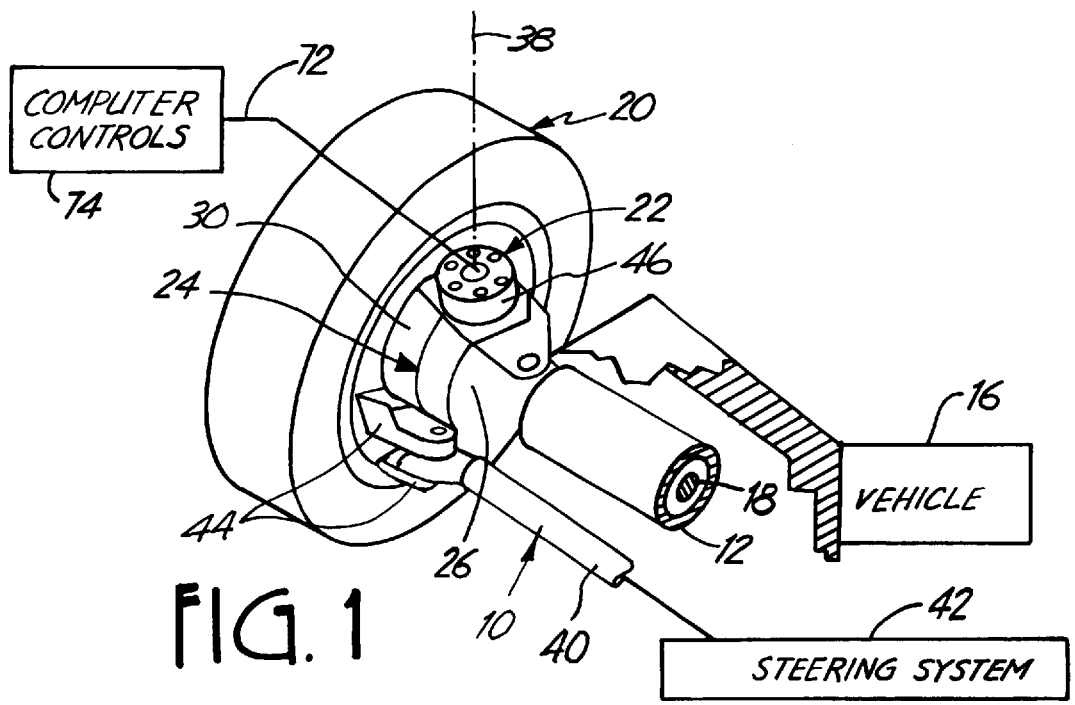
FIG. 1 is a perspective view of a typical wheel hub assembly including a steerable wheel support rotating housing, a fixed housing, and an axle support.
Figure 2:
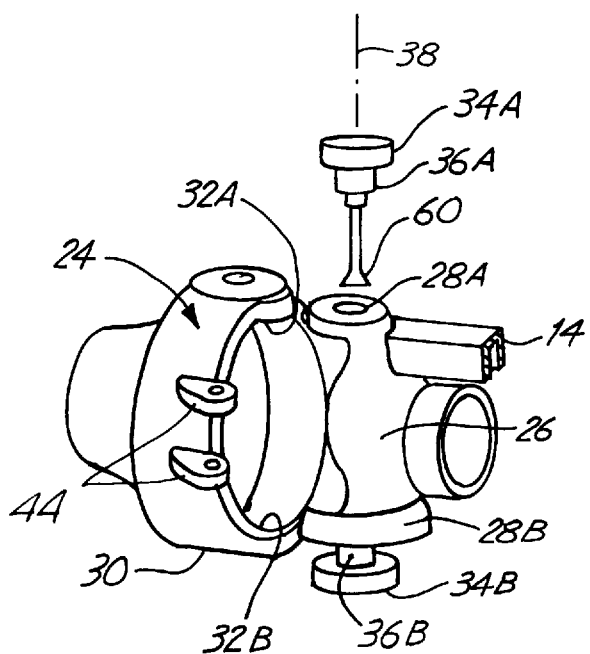
FIG. 2 is an exploded view show in the assembly of FIG. 1.
Figure 3:
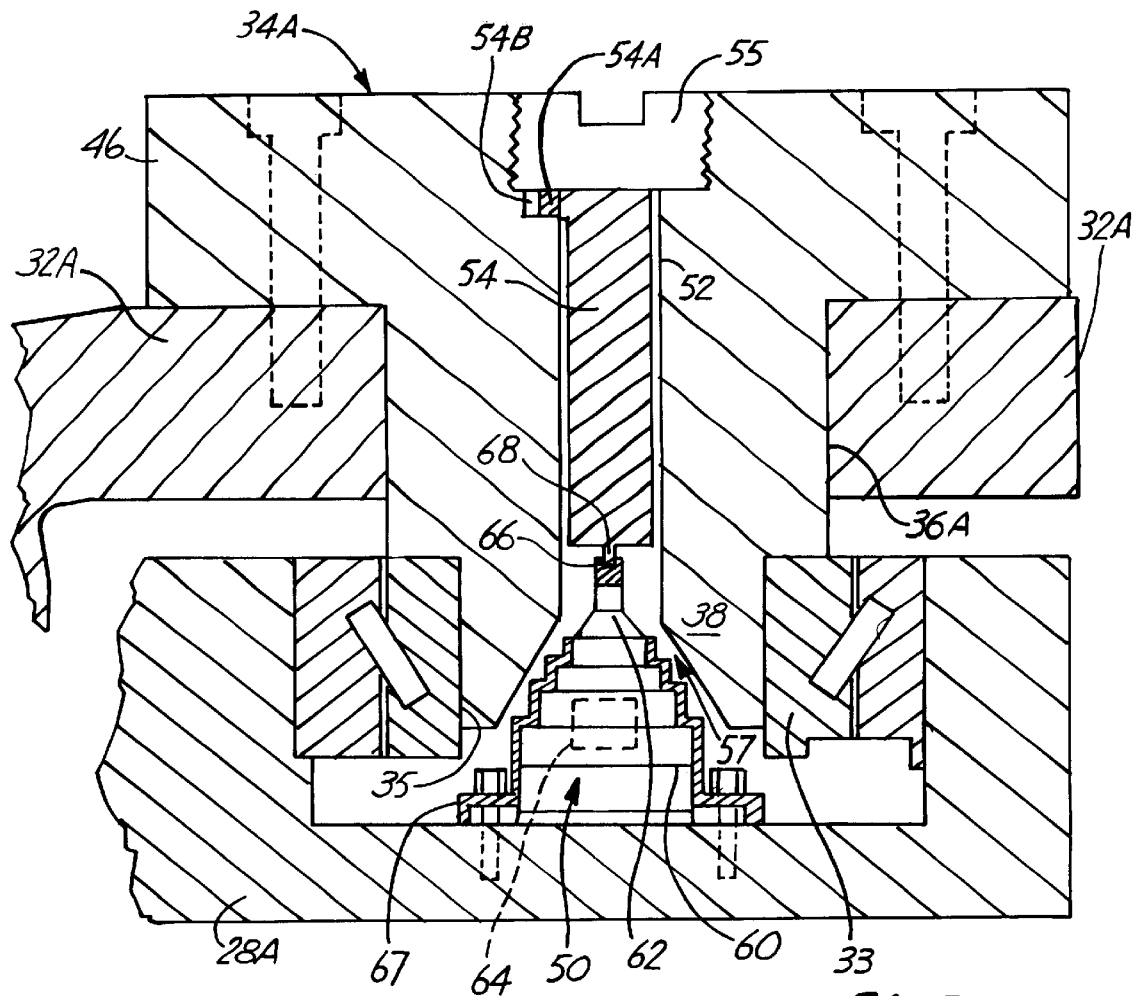
FIG. 3 is a sectional view of the actual upper kingpin assembly showing a rotatable sensor in place.

The axle assembly shown generally at 10 is illustrated schematically and apart from the vehicle but it does include an axle tube 12 that is suitably supported on a frame 14 on a vehicle indicated generally by the block 16. The axle tube houses a drive shaft 18 drives a wheel shown schematically at 20 through a universal joint that will permit steering the wheel 20 about a generally upright axis defined by a top kingpin assembly 22. A lower kingpin is also provided. The wheel 20 is supported on a steerable wheel housing or hub 24, which in turn is mounted onto a fixed wheel support housing 26 that comprises a fixed hub that is supported on the axle tube 12. The fixed hub 26 has mounting cups 28A and 28B at the top and bottom thereof as shown. The steerable wheel hub 24 has an annular flange 30 of size to fit around the fixed hub 26, and at the top and bottom of the annular flange 30 there are support pads or sections 32A and 32B. These support pads or sections have inner surfaces that fit over the cups 28A and 28B, respectively The flange pads or sections 32A and 32B have bores in them, which receive kingpin assemblies shown at 34A and 34B. The kingpins have shaft surfaces 36A and 36B that fit into the bores in the support sections 32A and 32B of the wheel hub and fit into bores 35 of bearings, such as bearing 33 shown in the cup 28A on the fixed hub (FIG. 3). In this way, the wheel housing 24 is mounted for pivoting movement about the axis 38 of the kingpins. The steering about this axis is controlled by a drag link 40 from a steering drive 42 of conventional design. The drag link attaches to ears 44 on the pivotable or steerable wheel hub 24.

The upper kingpin assembly 34A is shown in FIG. 3 in greater detail, and in section. The kingpin 34A has a head 46 that extends laterally out from the side of the shaft surface 36A. Head 46 rests on the outer surface of the flange pad or section 32A and can be fastened with suitable cap screws when it is in place. The kingpin 34A has a shaft surface 36A that fits into bore 35 in the bearing 33 to hold the wheel hub in position on the fixed wheel support housing. The steering housing is mounted to the fixed housing for steering. The lower kingpin 34B connects the wheel hub to the fixed hub in the same manner, but the upper kingpin is adapted to hold the angle sensor assembly indicated at 50.

Figure 4:
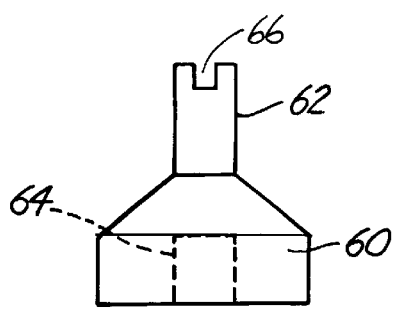
FIG. 4 is a perspective view of the sensor that is utilized.

The angle sensor assembly 50, as perhaps also best seen in FIG. 4, is a typical angle sensor made by the Torrington Company, and has a housing 60, and a rotating drive shaft 62. The housing 60 includes a sensor assembly indicated at a block 64 in FIG. 3. This sensor assembly is a conventional type sensor that has a fixed housing 60 portion and a rotatable shaft portion 62. Rotation of the drive shaft 62 relative to the sensor housing 60 from a reference position will cause a signal to be generated, indicating the amount of turn from the reference position. Preferably a Hall effect sensor can be used, where the Hall effect sensor is on the stationary housing and the magnet rotates on a ring around the sensor. The change in the angle of the magnet relative to a reference results in a change in sensor output, since the sensor detects magnetic flux perpendicular to the sensor.

The drive shaft 62 fits into a bore in the shaft 54 and has a slot at the end thereof indicated at 66. The bore in the shaft 54 has a screwdriver end or tang, shown schematically at 68, that fits into the recess or groove or slot 66 in the end of the sensor drive shaft 62.

The sensor housing 60 is fixed to the cup 28A with a bracket 67 that is like a sleeve over the housing 60. The bracket 67 is attached to the cup 28A with cap screws. Thus the housing 60 is held from rotating when the shaft 62 rotates. As the movable wheel housing 24 is steered by operating the drag link 40 so that the movable wheel housing steers the wheel 20 about the axis 38, the kingpin will drive the shaft 54, which drives the shaft 62 of the sensor. The pivoting of the wheel will result in an electrical signal carried along a line 72 to suitable computer controls or the like indicated at 74 for an input for controlling the other wheels of the vehicle. For example, the controls can match the amount of angle of the one wheel relative to the wheel on the same axle or for controlling maximum vehicle speed, in tight turns.

The kingpin mounting protects the sensor from harsh environments, in that the sensor is internal in the recess in the cup 28A for the bearing 33 and in the recess 57 in the end of kingpin 34A and thus is not exposed. The mounting does not reduce the ground clearance, or cause other restrictions of normal operations of the steerable wheel and the vehicle to which it is attached. By placing the sensor wholly or partially within the recess in the end of the kingpin, the sensor accurately measures the relative or absolute angle between the fixed and movable housings of the steering assembly.

The sensor can be driven directly by a coupling to the kingpin, or from the drive shaft 54 that is inserted from the top of the kingpin as shown. A drive shaft from the top eases assembly and allows for some misalignment between the sensor and the kingpin which may occur from loading. The kingpins serve as guides for the bearings used for supporting the movable housing for rotation about the kingpin axis.

The sensor assembly converts rotary motion or position into a signal that can be used to monitor the position of the steerable or rotating housing. The sensor signal can be used as a feedback element in a control loop that is used to position the rotating housing in a closed loop or to limit the speed of steering movement. In other words, the rate of steer can be controlled by the angle sensor signal. The sensor drive shaft is a positive connection so that it will insure the absolute position of the sensor relative to the fixed and rotating housings. The sensor shown has a range of rotation of about 170°, and the slot that interfaces with the kingpin drive can be made to have a unique position configuration, as does the shaft 54 so that the orientation of the sensor will be correct. Other couplings can be provided for driving the sensor shaft, such as irregular cross section shafts.

The drive directly from the kingpin itself can be made utilizing a pin that goes across the bore in the kingpin or a projection on the interior of the kingpin that would engage the drive shaft for the sensor.

Although the present invention has been described with reference to preferred embodiments, workers skilled in the art will recognize that changes may be made in form and detail without departing from the spirit and scope of the invention.

What is claimed is:

1. An angle sensor assembly for mounting in a pair of relatively movable housings held together with a kingpin in at least one location, a first wheel housing being mounted for rotation relative to a second wheel support housing, an angle sensor, the angle sensor having a fixed portion and a rotatable shaft portion, the fixed portion of the sensor being coupled fixedly to the second wheel support housing, said kingpin having a central bore with a recess at an outer end including a lug receiving portion, a drive shaft in the bore and having a drive shaft lug in the lug receiving portion of the recess for drivably connecting the drive shaft to the kingpin, and the rotatable shaft portion being connected to the drive shaft.

2. The sensor assembly of claim 1, wherein there are two kingpins for holding the first wheel and second wheel support housings together, the kingpins being on a common axis, and being spaced apart, the sensor being positioned between the two kingpins.

3. The sensor assembly of claim 1, wherein said second housing is a fixed housing coupled to a vehicle axle.

4. The sensor assembly of claim 1, wherein said kingpin has a head portion, and a shaft portion, the shaft portion being adapted to hold the first and second housings in an aligned position for relative pivoting.

5. A steerable wheel assembly comprising a wheel hub, a wheel support housing for supporting the wheel hub, the wheel support housing having a bearing recess, a bearing mounted in the bearing recess, a king pin for mounting the wheel hub to the wheel support housing and having a king pin shaft portion mounted on the bearing and having a head portion supported on the wheel hub, a sensor for sensing the amount of pivotable movement of the wheel hub relative to the wheel support housing including an angle sensor having a first sensor portion mounted to the wheel support housing in the bearing recess, and a rotatable sensor shaft portion, the king pin having a central bore therethrough, the king pin having a king pin head recess larger than the bore and opening to the bore, and including a lug receiving recess portion on an inner end of the king pin head recess, the opposite end of the bore in the kingpin opening to the bearing recess, the king pin bore having an outwardly expanding inner end chamber receiving the first portion of the sensor, the sensor shaft portion being centered in the king pin bore, a drive shaft mounted in the king pin bore and having a lug on an outer end thereof projecting laterally from the drive shaft, the lug being drivably received in the lug receiving portion, and the drive shaft having an inner end drivably coupled to the sensor shaft, and a plug in the king pin head recess.

6. The steerable wheel assembly of claim 5, wherein the coupling between the drive shaft and the sensor shaft comprises a slot in one of the shafts, and a tang on the other of the shafts received in the slot on the one shaft.

* * * * *

UNITED STATES PATENT AND TRADEMARK OFFICE
CERTIFICATE OF CORRECTION

PATENT NO. : 6,568,696 B2
DATED : May 27, 2003
INVENTOR(S) : Jason A. Osborn et al.

It is certified that error appears in the above-identified patent and that said Letters Patent is hereby corrected as shown below:

Column 2,
Line 50, please insert -- The upper kingpin 34A has a central bore 52 that has a drive shaft 54 mounted therein. The shaft 54 has a lock tab 54A that fits into a recess 54B to keep the shaft locked to rotate with the kingpin. The recess 54B is orented so the shaft 54 is oriented in a known position. The threaded plug 55 holds shaft 54 in place with lock tab 54A in recess 54B. The upper kingpin 34A rotates with the wheel hub. --

Signed and Sealed this

Fourth Day of January, 2005

JON W. DUDAS
*Director of the United States Patent and Trademark Office*